United States Patent

[11] 3,627,726

[72] Inventor Arthur J. Krawczyk
Cheektowaga, N.Y.
[21] Appl. No. 791,136
[22] Filed Jan. 14, 1969
[45] Patented Dec. 14, 1971
[73] Assignee Textron-Inc.

[54] POLYURETHANE COATINGS HAVING INTUMESCENT PROPERTIES
15 Claims, No Drawings

[52] U.S. Cl............................................. 260/45.7 P,
117/136, 260/77.5 AR, 260/77.5 AT
[51] Int. Cl........................................... C08g 22/20,
C09k 3/28
[50] Field of Search........................................... 260/2.5 AJ,
45.7 P, 77.5 AT

[56] References Cited
UNITED STATES PATENTS

| | | | |
|---|---|---|---|
| 3,058,941 | 10/1962 | Birum | 260/30.6 |
| 3,143,517 | 8/1964 | Heiss | 260/18 |
| 3,159,591 | 12/1964 | Lanham | 260/2.5 |
| 3,275,578 | 9/1966 | Pedjac et al. | 260/2.5 |
| 3,393,239 | 7/1968 | Wolfe, Jr. | 260/570 |
| 3,427,346 | 2/1969 | Brotherton et al. | 260/485 |
| 3,448,075 | 6/1969 | Clark et al. | 260/45.85 |

*Primary Examiner*—Donald E. Czaja
*Assistant Examiner*—R. A. White
*Attorneys*—John W. Behringer, Eugene L. Bernard, Martin J. Brown, James N. Dresser, W. Brown Morton, Jr., John I. Roberts and Malcom L. Sutherland ABSTRACT: There is disclosed compositions having intumescent properties and containing a material of the formula

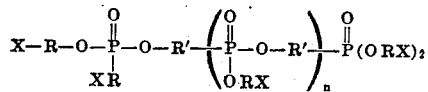

wherein R and R' are alkylene of 1 to 3 carbon atoms, X is chlorine or bromine, and $n$ is 1 to 4, and a polyurethane made by reaction of bis(2-isocyanatoethyl) fumarate and one or more polyhydroxy materials having a molecular weight of up to about 500 on a total carbon, hydrogen and oxygen basis.

This invention relates to fire retardant compositions. More particularly, the present invention is concerned with fire retardant compositions containing a material of the formula

POLYURETHANE COATINGS HAVING INTUMESCENT PROPERTIES

This invention relates to fire retardant compositions. More particularly, the present invention is concerned with fire retardant compositions containing a material of the formula

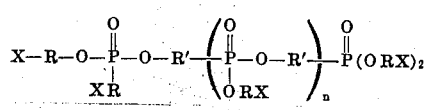

wherein R and R' are alkylene of one to three carbon atoms, X is chlorine or bromine, and $n$ is 1 to 4, (hereinafter referred to as phosphonate A), and a polyurethane made by reaction of bis(2-isocyanatoethyl) fumarate and one or more polyhydroxy materials having a molecular weight of up to about 500 on a total carbon, hydrogen and oxygen basis. The compositions of this invention are especially distinguished by their intumescent properties which can be obtained without the presence of insoluble materials in the liquid forms of the compositions. The cured products also exhibit good resistance to yellowing when subjected to ultraviolet light.

The importance of imparting fire retardant characteristics to building materials and other substrates of the flammable type cs widely recognized. By and large it is not practical, even if possible, to make flammable building materials completely fire resistant. However, it is very desirable to give to such materials sufficient fire retardant properties to delay the spread of fire to allow the escape of occupants from burning structures and to give time for firemen to arrive on the scene, to take action before the structure is consumed and the fire transferred to nearby buildings and equipment. A most convenient manner of imparting such characteristics to the building materials is to coat them with a liquid which will cure or dry to a more or less hard film, for instance, in the presence of the moisture in the atmosphere or through other chemical or physical actions. These coating materials often have a principal ingredient a base or prepolymer vehicle which is referred to as a moisture-curing vehicle. The vehicles may also be cured by other means such as through reaction with amines or polyols or by solvent evaporation. Such products are applied to plywood and other types of panelling and combustible materials used in forming walls and other structures in commercial and domestic buildings.

There are several ways in which the fire retardant properties of building materials may be evaluated. One procedure can be readily applied in the ordinary laboratory. This operation employs a small metal cabinet described in ASTM D 1360 found in ASTM, part 21, Jan. 1965, Fire Retardancy of Paints (Cabinet Method), the cabinet having a glass door for observing burning in the cabinet. The cabinet also has holes around its bottom for air draft with a chimney serving as a smoke outlet. A 12 inches × 6 inches × ¼' wood panel, for instance, poplar, although birch can be used for a more rigorous test, is covered with the coating to the tested and then the coating is allowed to dry or cure for at least about 2 days. Two or three coats of film may be applied and three coats give good film thickness for an adequate determination of fire retardance and intumescence. The coated panel is placed on a metal frame at a 45° angle in he test cabinet. A measured amount of ethanol, for instance, 5 ccs., or less for a less severe test, is placed in a small iron cup below the panel, so that when ethanol is burned the flame impinges against the underside of the panel. In the test the ethanol is ignited and allowed to burn out and the degree of burning of the panel and amount of intumescence are observed during burning and also when burning is finished. Fire retardancy and intumescence properties can also be determined by subjecting the materials under test, for instance, as bulk coating compositions. In one such test a small iron spoon is filled with vehicle and the solvent allowed to flash off by heating and burning. When the solvent flame ceases, the spoon is placed in the burner flame and the formation of intumescence or lack of it, noted.

The present invention provides normally liquid compositions which when applied to a flammable building material or other combustible substrate, especially wood, impart thereto outstanding resistance to burning. The compositions need not contain dispersed solid materials which can have a tendency to settle or give hazy or unclear products nor is it necessary to include any halogen components in the reactants which form the polyurethane. Moreover, cured forms of the compositions of this invention exhibit good resistance to yellowing when subject to ultraviolet light. Coatings made from the compositions of this invention may also have good stability, hardness and flexibility upon drying.

The compositions of this invention have these desirable properties as a result of a selection of the ingredients employed in making products which also serve, at least in substantial part, to provide desirable fire retardant properties through intumescent action. Thus, the compositions contain a polyurethane made by using as essential reactants bis(2-isocyanatoethyl)fumarate and urethane-forming polyhydroxy reactants having a molecular weight of up to about 500, preferably up to about 300, on a total carbon, hydrogen and oxygen basis, to form normally liquid polyurethanes which can be cured to a solid state, preferably as a coating supported by a solid substrate. The compositions also contain as a essential ingredient a phosphonate A described herein. The amount of phosphonate A added to the polyurethane is sufficient to impart the desired intumescent properties and is often at least about 10 weight percent based on the prepolymer solids and not materially beyond the limit of solubility in the vehicle. Preferred amounts are about 15 to 100 weight percent based on prepolymer solids. The phosphonate A can be added to the prepolymer at any convenient temperature and the additions described in the examples which follow were at ambient temperature.

Phosphanate A-type materials are described in U.S. Pat. No. 3,058,941. I prefer to employ the chlorine-containing members of this group and especially those in which the R groups are —$CH_2CH_2$— and the R' groups are

Those phosphonate A's in which $n$ is 1, have been used with advantage. A particularly effective phosphonate A (hereinafter referred. to as $A_1$) has the following formula:

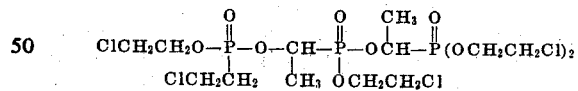

Other useful phosphonate A's can have one or more methyl or propyl R or R' groups and the halogens can be bromine or both bromine and chlorine. Materials of these types are disclosed in U.S. Pat. No. 3,058,941, e.g.

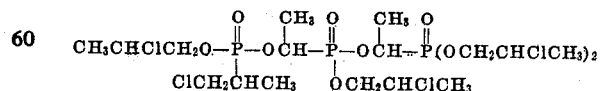

and are herein incorporated by reference.

One reactant employed in making the polyurethane component of the compositions of the present invention is bis-(2-isocyanatoethyl)fumarate, although one or more of a variety of other polyisocyanates may also be employed as a minor equivalent proportion of the total isocyanate reactant. These other polyisocyanates can be aromatic or aliphatic or mixed aromatic aliphatic polyisocyanates. The aliphatic polyisocyanates form polyurethanes with greater resistance to yellowing when subjected to ultraviolet light. The isocyanates may be substituted with noninterfering groups, such as aliphatic hydrocarbon radicals, e.g., lower alkyl groups. Suitable other polyisocyanates which can be employed in addition to bis(2-isocyanatoethyl)fumarate, include 2,6-tolylene diisocyanate, 2,4-tolylene diisocyanate, p-phenylene diisocyanate, p,p'-diphenylmethane diisocyanate, 1,5-naphthylene diisocyanate, hydrogenated forms of these cyanato-3-isocyanatomethyl-3,5,5-trimethylcylohexane, etc.

The amount of polyisocyanate component, bis(2-isocyanatoethyl)fumate plus any other polyisocyantes, employed in making the polyurethane component of the compositions of this invention can vary depending on the type of polyurethane to be obtained. In prepolymer vehicles, which are preferably of the moisture curing type, but can be cured by reaction with other active hydrogen-containing materials (the term active hydrogen as used throughout this specification refers to active hydrogen as determined by the Zerewitinoff test, J. Am. Chem. Soc. 49, 3181, 1927), such as polyamines or polyols, there is an excess of isocyanate groups to hydroxyl groups of the polyol reactant, for instance a total NCO to OH ratio of at least 1.2:1, generally up to about 3.5:1 or more. These normally liquid, prepolymer vehicles often contain about 3 to 20 weight percent of free isocyanate groups. In the case of moisture-curing prepolymer vehicles there can be used a ratio of isocyanate groups to hydroxyl radicals of about 1.3 to 2.5:1, preferably about 1.8 to 2.2:1, based on the total of the diisocyanate and polyhydric alcohol reacted. such reaction mixtures contain an excess of isocyanate groups sufficient to provide a moisture-curing vehicle. The isocyanate group in the moisture-curing vehicles, aside from any unreacted diisocyanate present, are generally at least about 0.1 weight percent of the composition, e.g., up to about 20 percent with about 0.5 to 10 percent being preferred. In the case of polyol-curing prepolymers the prepolymer-forming reaction mixture generally contains a ratio of isocyanate groups to hydroxyl radicals of about 1.4 to 3.5:1 or more, preferably about 1.6 to 2.1:1. In the polyol-curing prepolymer vehicles the free-isocyanate groups can often be about 1 to 20 weight percent preferably about 2 to 12 weight percent of the vehicle.

The second essential reactant used in making the polyurethane component of the fire retardant and intumescent compositions of the present invention is one or more polyhydroxy-containing reactants in which the total carbon, hydrogen and oxygen atoms contribute up to about 500 to the molecular weight, preferably up to about 300, per molecule. The polyol may be selected from a wide variety of polyhydroxy materials which may be aliphatic, including cyloaliphatic, aromatic or mixed aliphatic-aromatic hydrocarbon compounds, including substituted hydrocarbon compounds. Preferably the polyhydroxy reactant is composed to a major extent, or even entirely, on an equivalent basis, of dihydroxy components. Although halogen-bearing polyhydroxy materials can be used such are not necessary to obtain products of desirable fire retardant and intumescent properties, for instance, 556-di(hydroxymethyl)-1,2,3,4,7,7-hexachlorobicyclo-]2.2.1]-heptene-2 has been found to be useful in this invention. Also a minor proportion of the total polyhydroxy reactant can have higher molecular weight than the essential and major polyhydroxy component. Representative polyhydroxy classes and individual compounds are given below.

The polyol may be a phenoxy ether diol. These materials can be made, for example, from chlorodihydroxy alkanols through reaction with a suitable sodium phenate. The phenoxy ether diols can be represented by the formula:

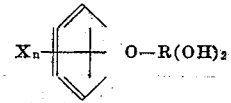

in which X is halogen having an atomic number from 17 to 35, that is, chlorine or bromine and n is a number from 0 to 5. Also in the formula, R is an alkyl, including cycloakyl, radical of three to 12 carbon atoms, preferably three to six carbon atoms. The phenyl group of these compounds can also be further substituted, e.g., with lower alkyl groups, and the compounds can also contain other noninterfering substituents. It is preferred that the two illustrated hydroxy groups of this reactant be attached to separate secondary and primary carbon atoms. Also the alkyl radical R may have its carbon-to-carbon chain interrupts as with one or more oxygen atoms. Representative reagents of this type, include for instance, 1-phenoxy-2,3-propane diol, pentachlorophenoxy glyceryl ether, 2,4,6-trichlorophenoxy glyceryl ether, 1-tetrabromotoloxy-3, 4-dihydroxy butane, 1-pentachlorophenoxy-2,6-dihydroxyhexane, etc.

The polyhydroxy reactant employed in making the polyurethane-type reaction product of the present invention can be one or more aliphatic polyols, e.g., polyhydric alkanol, which can be the only polyol used or other polyols may also be employed with the aliphatic polyols. The aliphatic polyols have at least two carbon atoms, and among the wide variety of such materials which can be used are those represented by the formula:

in which R' is an aliphatic hydrocarbon radical, preferably saturated, and R'' is an alkylene radical of 2 to 4 preferably two to three carbon atoms, R' generally has 2 to 12 preferably two to six carbon atoms. The letter n represents a number from 0 to about 10, preferably 0 to 5, while the letter m is 0 to 1, preferably 1. When n is other than 0, and m is 0, R' will often be the same as R''. The aliphatic polyol reactant can be substituted with nondeleterious substituents. Suitable aliphatic polyols include ethylene glycol, propylene glycol, polyethylene and polypropylene glycols of up to about 500 molecular weight, trimethylol propane, trimethylol ethane, 1,6-hexamethylene glycol, 1,2,6-hexanetriol, etc. The aliphatic polyols of essentially dihydroxy functionality, i.e., where m is 0 are preferred. Moreover, it is further preferred that the diol bear essentially no active hydrogen atoms other than those of the two hydroxyl groups.

The polyurethane component of the compositions of the present invention can also be made from aromatic and mixed aromatic-aliphatic polyhydroxy reactants. Among the useful materials of these types are those having the formula:

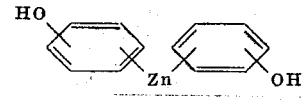

wherein Z in an organic radical such as an aliphatic, including cycloaliphatic, hydrocarbon group, for up to about 12 carbon atoms, preferably one to about six carbon atoms, and n is 0 or 1. These polyhydroxy reactants can serve to harden films produced from the compositions of this invention and can, but need not necessarily, be substituted with one or more halogens such as chlorine or bromine, especially on the aromatic rings. Representative compounds of this type include 2,2-bis(4-hydroxyphenyl) propane, commonly called bisphenol A; 2,2-bis(4-hydroxycyclohexyl)propane; 2,2-bis(3,5-dichloro-4-hydroxyphenyl) propane and 3,3bis(4-hydroxyphenyl)decachloropentacyclo-[5.3.0.0$^{2,6}$.0$^{4,10}$.0$^{5,9}$]decane.

The normally liquid polyurethane-type reaction product of the present invention can be made by simultaneous reaction of the polyisocyanate and the polyhydroxy reactant. Alternatively, the polyisocyanate can be reacted with part or all of one or more of the polyhydroxy components prior to reaction with the remaining portion of these materials. Stepwise mixing of the polyisocyanate with the polyols can be used to enhance temperature control. The reaction temperatures for making the various urethanes of the present invention are often in the range of about 40° to 130° C., with about 50° to 110° C. being preferred; and the reaction is preferably continued until there is essentially little, if any, unreacted hydroxyl functionality remaining.

The polyurethane reaction products of the present invention are commonly prepared in the presence of an essentially inert solvent. The solvent serves to insure serves to insure that the reactants are in the liquid state and the solvent enables better temperature control during the reaction by serving as a heat sink and, if desired, as a refluxing medium. Various solvents including mixtures of such materials can be employed and among the useful solvents are the aliphatic and aromatic hydrocarbons, esters, ethers, ester-ketones, chlorinated hydrocarbons and the like and mixtures thereof. Frequently, the solvents are volatile materials which will be removed from the composition while it cures, for instance, as a coating or film, and in such case, there may be no need to remove any portion of the solvent from the reaction product prior to application as a coating. The may be relatively nonvolatile material and may be selected with a view to improving the fire retardant properties of the coating, for instance, when chlorinated hydrocarbons are used. The amount of solvent employed can vary widely and large volumes may be uneconomic or give materials with undesirably or inconveniently low viscosity. The amount of solvent may be selected in order to provide a reaction product of film application viscosity, but products of greater viscosity can be cut-back before use. Often about 0.25 to 6 weights of solvent, preferably about 0.5 to 3 weights of solvent, per weight of the total isocyanate and polyol are used. Among the suitable normally liquid solvents are xylene, ethylene glycol ethyl ether acetate, 1,1,1-trichloroethane, dimethylformamide, dimethylsulfone, dioxane, etc. and their mixtures; and it is preferred that the solvent not contain more than about 10 carbon atoms per molecule.

The rate of curing of the compositions of its invention can be enhanced as desired by incorporation of appropriate amounts of a catalyst which promotes the reaction of isocyanato groups with polyhydroxy material Typically organotin compounds for example dibutyl tin dilaurate and stannous octoate can be used. Other useful catalysts include tertiary aliphatic and alicyclic amines, such as triethyl amine, triethanol amine, tri-n-butylamine, triethylene diamine, alkyl morpholines and the like. Complex mixtures containing such catalysts in modified form can also be employed.

The prepolymer polyurethanes can be reacted with polyamines, often in the presence of a solvent for the prepolymer and the resultant urea-urethane solution can be referred to as lacquer-type vehicles. Upon evaporation of the solvent, if present, the urea-urethanes are solid materials having good properties including intumescence and resistance to the yellowing effects of ultraviolet light. The urea-urethanes are frequently elastomeric and can be used as coatings or in other forms when cured. The prepolymers employed to make the urea-urethanes often have a free isocyanate content of about 1 to 15 weight percent, preferably about 3 to 7 weight percent.

The urea-urethane can also be made by combining the urethane prepolymer which may be in a solvent to obtain a suitable viscosity, with the polyamine and the total amount or character of the solvent being such that the urea-urethane when formed is not in solution. Since under these conditions curing of the urea-urethane gives a solid in a very short time, the combination of the prepolymer and polyamine can be placed in desired form, e.g. as a film, etc., more or less immediately after the combination is made. This result can be accomplished for instance by spraying the prepolymer and polyamine separately from a two-headed spray gun onto a suitable substrate.

The amounts of the urethane prepolymer and polyamine reacted and the reaction conditions are chosen so that substantially all of the isocyanate content of the prepolymer is reacted on a weight basis. Since an approximately stoichiometric amount of polyamine is used the free isocyanate content of the urea-urethane is less than about .1 weight percent based on polymer solids, and often this free isocyanate content is less than about 0.5 percent. The urea-urethane-forming reaction can be conducted at ambient temperatures and generally the reaction temperature is in the range of about 10° to 120° C. or more, preferably about 50 to 100° C. The urea-urethane-forming reaction can, if desired, be catalyzed, for instance, by the use of catalysts similar to those mentioned above with respect to the urethane prepolymer-forming reaction. When the urea-urethane solution is cured the evaporation of solvent can be facilitated by the application of elevated temperatures. The cured polymer of this and the other forms of this invention is noncellular as distinguished from a foam.

Among the solvents which can be present during the urea-urethane-forming reaction are the various organic solvents such as aliphatic and aromatic hydrocarbons; oxygen-containing hydrocarbons, including alcohols, esters, ethers, glycol ether ester, ketones and amides; ring nitrogen-containing organic materials including the pyrrolidones; as well as chlorinated hydrocarbons and the like; and mixtures thereof. Solvents in which the major component by weight is dimethylformamide, have been found to be especially suitable.

The solvent may be similar to those employed in the urethane-forming reaction or different solvents may be sued in each reaction, and the solvent is essentially inert in this system. Solvents present during the urea-urethane-forming reaction are relatively volatile materials which will be removed from the composition while it cures to solid form. Although the amounts of solvents employed during the urea-urethane-forming reaction is conveniently that which will give a solution of application viscosity, lesser or greater amounts of solvents can be employed. Often about 1 to 10 weights of solvents per weight of the total prepolymer and polyamine are used. The urea-urethane solution is generally of suitable viscosity when the polymer solids comprise about 15 to 50 weight percent of the solution.

Specific solvents which can be employed in the urea-urethane-forming reaction often have up to about 10 percent carbon atoms and include those mentioned above with respect to the urethane prepolymer-forming system, with the proper attention being given to the degree of solubility exhibited by the prepolymer and the urea-urethane in a given solvent and the potential for reaction between the solvents and the polymer-forming materials. Thus, ethyl alcohol can be used since its reactivity with the NCO of the urethane prepolymer is slower than that of the polyamine.

The polyamines used to make the urea-urethanes of this invention can be selected from a wide variety of suitable materials. Thus, the polyamine may be aliphatic, including cycloaliphatic, aromatic or mixed aliphatic-aromatic and has at least about two amino ($-NH_2$) groups per molecule. Often the polyamine has up to about 40 or more carbon atoms, preferably about six to 15 carbon atoms, and may contain other substituents which may be reactive or nonreactive with isocyanate groups. The preferred polyamines are diamines and further, the aliphatic, including cycloaliphatic, structures are especially advantageous, particularly to insure that the products improved resistance to the degradative and yellowing effects of ultraviolet light.

Among the useful polyamines are the alkyl diamines such as ethylene diamines, propylene diamine, hexamethylene diamine, para-phenylene diamine, methylene dianiline, 1 - amino-3-aminomethyl- 3,5,5-trimethyl cyclohexane, hexamethylenediamine, trimethyl-hexamethylenediamine, tolylene diamine, hydrogenated di-(aminophenyl)methane etc. Other types of polyamines which can be used methane, etc. Other types of polyamines which can be used in forming the products of the present invention include 4,4-methylene-bis(2-chloroaniline) and N,N'-disecondary butylparaphenylene diamine.

The coating compositions of this invention are normally applied to substrates as films of less than about 50 mils thickness and can contain other additives to impart special properties such as plasticizers, etc. Also, the substrate for the coating may be specially treated materials, including flammable members impregnated with fire-resistant chemicals or coated with a sealant. The compositions of the invention can also be formed into sheets not integrally associated with a substrate or may be made into cured forms of other configuration.

The following examples will serve to illustrate further the present invention.

EXAMPLE I

Ninety grams (0.71 equivalent) of bis(2-isocyanatoethyl)fumerate, 30.5 grams (0.355 equivalent) of 1-phenoxypropane 2,3 diol, 40 grams of ethylene glycol ethyl ether acetate and 40 grams of xylene were placed in a glass flask provided with a stirrer, thermometer, reflux condenser and inlet for gaseous nitrogen. This mixture was heated for one hour with stirring while raising the temperature by means of a glass heating mantel to 75° C. At this temperature 0.12 gram of dibutyl tin dilaurate was added as a polymerization catalyst. The temperature of the mixture was kept at 115° to 124° C. during 5 hours and then the mixture was allowed to cool to room temperature. At this stage of the procedure the nonvolatile content of the prepolymer vehicle product was 59.9 percent by weight, the free isocyanate (percent NCO) 6.71 weight percent, the Gardner viscosity F ¼ and the Gardner color 4½. When 1 percent based on solids of dibutyl tin dilaurate was dissolved in this vehicle, it dried in a 3 mil wet film in 12 hours. Sixty grams of phosphonate $A_1$ were added to 100 grams of this vehicle along with 20 grams of ethylene glycol ethyl ether acetate and 20 grams of xylene and the whole mixture stirred to obtain a homogeneous solution. Three coats of this vehicle were brushed onto a poplar panel allowing drying to occur before applying the successive coats. Each coat was about 3 mil wet film. After drying, the panel was allowed to remain 48 hours at room temperature. The dried film was then subjected to an alcohol flame in the ASTM D—1360 test for fire retardancy. See ASTM, part 21, Jan. 1965 Fire Retardancy of Paints (Cabinet Method). When this ASTM test was applied to the coated panel, it was observed that excellent intumescence and protection of the wood substrate from burning occurred.

EXAMPLE II

Fifty seven grams (0.5 equivalent) of bisphenol A, 127 grams (1.0 equivalent) of bis(2-isocyanatoethyl)fumarate, 63 grams of xylene and 63 grams of ethylene glycol ethyl ether acetate were placed in a reaction system for preparing moisture-curing urethanes similar to the system described in example I. This mixture was stirred and heated under reflux and under gaseous nitrogen to 45° C. when 0.18 gram of dibutyl tin dilaurate catalyst was added which caused the mixture to emit heat and the temperature to rise to 78° C. in a few minutes. About an hour after adding the catalyst the temperature was raised to 105° C. The temperature was maintained in the range of 98° to 105° C. for 2 hours and then the mixture was allowed to cool to room temperature. At this point the prepolymer mixture analyzed 59.7 percent by weight nonvolatile, 6.55 weight percent free isocyanate (NCO), 0+¼ Gardner viscosity and 2+ Gardner color. Forty grams of this prepolymer vehicle, 12 grams of phosphonate $A_1$, 4.0 grams of xylene and 4.0 grams of ethylene glycol ethyl ether acetate were mixed together to give another vehicle with 60 percent nonvolatile. Three coats of this vehicle were brushed onto poplar wood so that the finally dry film was about 6 mils. Hardness of this film was 48 after 47 hours. Drying of the film occurred in 3½ hours when the vehicle contained 2 weight percent N-cocomorpholine based on solids. The film of this vehicle when exposed to ultraviolet light from a 400 watt mercury vapor lamp at a distance of 18 inches from the film for 2 hours showed very good resistance to yellowing. The 6 mil film of poplar wood showed good intumescence and fire retardance tested by the ASTM D—1360 Method.

EXAMPLE III

An elastomeric product was prepared by adding 3.2 grams of phosphonate $A_1$ and 2.9 grams of 4,4'-diaminodiphenylmethane dissolved in 70 grams of dimethyl formamide to 20 grams of a prepolymer vehicle product prepared as in example I but having an NCO of 6.3 percent weight. This lacquer solution formed as a sheet 0.017 inch thick, was then cured for 3 days at 60° C. in a forced air oven. Samples taken from this sheet gave a tensile strength of 1,176 p.s.i. and elongation of 235 percent. Testing of fire retardant properties showed that when placed in the flame of a bunsen burner the elastomer sheet intumesced considerably and upon removal from the flame combustion ceased immediately.

EXAMPLE IV

Two hundred fifty four grams of bis(2-isocyanatoethyl) fumarate, 165 grams of bisphenol K, 3,3-bis(4hydroxyphenyl decachloropentacyclo [5.3.0.0 $^{2,6}$ .0 $^{4,10}$ .0 $^{5,9}$ ]decane (see Journal of Chemical & Engineering Data, vol. 11, No. 2, pages 409–412, Apr. 1966 ), 80 grams of bisphenol A, 160 grams of ethylene glycol ethyl ether acetate, 160 grams of xylene and 0.49 gram of dibutyl tin dilaurate were placed in a three necked, one liter reaction vessel and the ingredients heated at 80° C. and stirred under gaseous nitrogen for 4 hours. At this stage i the process the vehicle had a nonvolatile content of 61.2 weight percent, a free isocyanate content (free NCO) of 4.4 weight percent, a viscosity of 5 stokes and a Gardner color of one. When this vehicle was mixed with phosphonate $A_1$ on the basis of two parts by weight of vehicle solids to one part of phosphonate $A_1$ and the resulting mixture submitted to burning in a laboratory burner flame, a very good intumescence and fire retardance were noted.

EXAMPLE V

One hundred eighty grams of bis(2-isocyanatoethyl) fumarate, 32 grams of 1,2,6-hexanetriol, 71 grams of xylene, 71 grams of ethylene glycol ethyl ether acetate and 0.21 grams of dibutyl tin dilaurate were placed in a one liter, three necked reaction vessel and heated and agitated under dry, gaseous nitrogen at 90° C. for about 5 hours. After heating for one hour during this 5 hour period, the vehicle was hazy. Fifty grams of ethylene glycol ethyl ether acetate and 20 grams of dimethyl formamide were added to the vehicle to give a clear solution. The resulting vehicle showed a nonvolatile content of 50.1 weight percent, a free isocyanate value (free NCO) of 7.0 weight present, a viscosity of 1.8 stokes and a Gardner color of one minus. When this vehicle was mixed on the basis of 2 parts by weight of its solids to one part of phosphonate $A_1$ and a portion of the vehicle submitted to the flame from a laboratory burner, the intumescence obtained was excellent.

EXAMPLE VI

Two hundred fifty four grams (two equivalents) of bis(2-isocyanatoethyl) fumarate, 180 grams (one equivalent) of 5,6-di(hydroxymethyl)-1,2,3,4,7,7-hexachlorobicyclo-[2.2.1 ]-heptene-2, known as Het diol, 145 grams of ethylene glycol ethyl ether acetate, 145 grams of xylene and 0.43 grams of dibutyl tin dilaurate were charged to a one liter, three necked reaction flask, stirred and heated under dry, gaseous nitrogen for 3 hours at 80° C. and for 4 hours at 100° C. until the free isocyanate value (free NCO) of the vehicle reached 5.3 weight percent. The vehicle thus produced had a nonvolatile content of 62.3 weight percent by weight, a viscosity of 1.3 stokes and a Gardner color of 6. A mixture of 100 grams of this vehicle, 31.1 grams of phosphonate $A_1$ and 0.62 grams of dibutyl tin dilaurate dried in 3¾ hours to a mar free film on a Morest chart after being applied at 1.5 mils wet film. The resistance of this film when exposed to the ultraviolet light from a 400 watt mercury arc lamp placed 18 inches above the film for 2 hours, was superior to that of a film from a similar vehicle whose isocyanate was a mixture of 80 percent by weight 2,4-and 20 percent 2,6-tolylene diisocyanate. When a portion of the vehicle made from bis(2-isocyanatoethyl) fumarate was burned in a metal spoon in the flame of a laboratory burner, an excellent intumescence was formed and good resistance to burning was noted.

EXAMPLE VII

One hundred twenty seven grams of bis(2-isocycanatoethyl)furmarate, 60 grams of tripropylene glycol, 62.5 grams of ethylene glycol ethyl ether acetate, 62.5 grams of xylene and 0.187 grams of dibutyl tin dilaurate were charged to a 500 milliliter, three-necked flask and the exothermic heat allowed to dissipate with stirring under gaseous nitrogen. Heat was then applied to the mixture for 4 hours and its temperature kept at 80° C. The vehicle so produced had a nonvolatile content of 60.1 weight percent, a free isocyanate value (free NCO) of 4.8 weight percent, a viscosity of 1.9 stokes and an American Public Health Association (APHA) color of 50. A mixture of this vehicle and phosphonate $A_1$ on the basis of 2 parts by weight solids to one part phosphonate $A_1$ exhibited good intumescence and fire retardance when burned in the flame of a laboratory burner.

EXAMPLE VIII

Twenty five grams of prepolymer vehicle whose preparation is given in example II, 4 grams of phosphonate $A_1$, 3 grams of 1-amino-3-aminomethyl-3,5,5-trimethyl cyclohexane and 80 grams of dimethyl formamide were stirred together with the evolution of some heat. Sixty grams of this mixture were cured for 3 days at 60° C. to form a film about 12 mils thick. This film had a tensile strength of 2,367 p.s.i. and an elongation of 200 percent. This mixture was also coated onto a birch panel and cured at 25 mils dry film thickness. When subjected to the flame of a laboratory burner, good fire retardance and excellent intumescence were observed.

The following examples illustrate that the intumescent characteristics of polyurethane compositions containing phosphonate $A_1$ are substantially reduced when tolylene diisocyanate is used in making the polyurethane.

EXAMPLE IX

Three hundred eighty one grams (4.38 equivalents) of 80 percent 2.4-and 20 percent 2,6-tolylene diisocyanate (80/20-TDI), 96 grams (2.15 equivalents) of 1,2,6-hexanetriol, 159 grams 2-ethoxyethyl acetate and 159 grams of xylene were placed in a Pyrex flask having a reflux condenser, water trap, thermometer, mechanical stirrer and provision for blanketing the reaction mixture with gaseous nitrogen. Heating was started by means of an electric heating mantel and after 1¼ hour of heating with agitation with the temperature of the reaction mixture at 80° C., 100 milliliters of dimethyl formamide was added to assist solution of insoluble material. After heating at 80° to 89° C. for a total period of 6 hours, the mixture was filtered to remove about 80 grams of wet gel particles. The remaining liquid vehicle had a nonvolatile content of 9.0 percent, a free NCO content of 8.96 percent and a viscosity of 5.4 stokes. When this vehicle was mixed 2:1 by weight on a solids basis with phosphonate $A_1$ and a portion of the resulting mixture burned in a spoon in a laboratory burner flame, it intumesced poorly compared with a similar vehicle made using bis(2-isocyanatoethyl) fumarate in place of tolylene diisocyanate and mixed 2:1 with phosphonate $A_1$.

EXAMPLE X

In another preparation 348 grams of 80/20 TDI, 228 grams of bisphenol A, 150 grams xylene, 150 grams 2-ethoxyethyl acetate and 0.57 grams of dibutyl tin dilaurate were made into a urethane prepolymer vehicle in the usual way heating at about 80° C. for 8½ hours and at 120° C. for 8 hours more. The NCO value was 9.6 percent while the nonvolatile content was 65 percent for this vehicle. When the vehicle was mixed 2:1 by weight on a solids basis with phosphonate $A_1$ the vehicle intumesced only fair compared with a similar vehicle made with bis(2-isocyanatoethyl) fumarate blended on a 2:1 solids basis with phosphonate $A_1$.

It is claimed:

1. A normally liquid polyurethane composition consisting essentially of a prepolymer having free isocyanate content and prepared from bis(2-isocyanatoethyl)fumarate and polyhydroxy reactant having a total carbon, hydrogen and oxygen molecular weight of up to about 500, and an amount sufficient to impart intumescent properties to cured films of said composition of material having the formula:

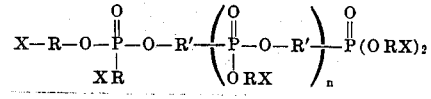

wherein R and R' are alkylene of one to three carbon atoms, X is chlorine or bromine and $n$ is 1 to 4.

2. The composition of claim 1 in which $n$ is 1.
3. The composition of claim 2 in which $x$ is chlorine.
4. The composition of claim 3 in which said material has the formula:

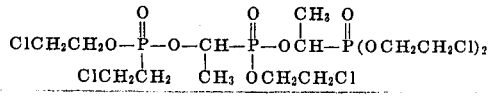

5. The composition of claim 4 wherein the total carbon, hydrogen and oxygen molecular weight of the polyhydroxy reactant is up to about 300 and this reactant is composed to a major equivalent extent of dihydroxy reactant.
6. The composition of claim 5 wherein the amount of said material is about 15 to 100 percent based on the weight of the prepolymer.
7. The composition of claim 6 wherein the polyhydroxy reactant is 2,2-bis(4-hydroxyphenyl)propane.
8. A polyurea-urethane obtained by reacting the composition of claim 1 with an approximately stoichiometric amount of polyamine.
9. The composition of claim 8 in which the polyamine is diamine.
10. The composition of claim 9 in which $n$ is 1.
11. The composition of claim 10 in which X is chlorine.
12. The composition of claim 11 in which said material has the formula:

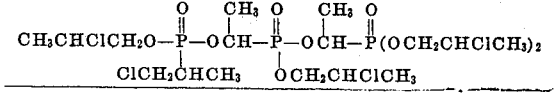

13. The composition of claim 12 wherein the total carbon, hydrogen and oxygen molecular weight of the polyhydroxy reactant is up to about 300 and this reactant is composed to a major equivalent extent of dihydroxy reactant.
14. The composition of claim 13 wherein the amount of said material is about 15 to 100 percent based on the weight of the prepolymer.
15. The composition of claim 14 wherein the polyhydroxy reactant is 2,2-bis(4-hydroxyphenyl)propane.

* * * * *

UNITED STATES PATENT OFFICE
CERTIFICATE OF CORRECTION

Patent No. 3,627,726                    Dated December 14, 1971

Inventor(s) Arthur J. Krawczyk

It is certified that error appears in the above-identified patent and that said Letters Patent are hereby corrected as shown below:

ABSTRACT: Delete the paragraph which begins "This invention relates...."

Column 1, line 26, change "os" to --is--

Column 3, line 5, after "these" insert --aromatic diisocyanates, hexamethylene diisocyanate, 1-iso- --

Column 3, line 46, change "cyloaliphatic" to --cycloaliphatic--

Column 3, line 55, change "556" to --5,6--

Column 3, line 66, diagram reads:                          should read:

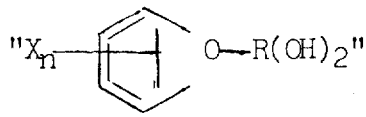 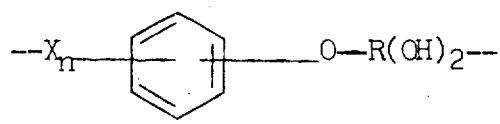

Column 5, line 3, delete one "serves to insure"

Column 5, line 15, change "The may be" to read --The solvent may be a--

Column 6, line 64, add a --comma-- at the end of the line.

Column 6, line 65, delete the entire line.

Column 7, line 68, change "47" to --48--

Column 8, line 18, change "(4hydroxyphenyl" to --(4-hydroxyphenyl)--

Column 8, line 27, delete the "i" standing alone.

Column 9, line 44, reads "2.4" should read --2,4--

UNITED STATES PATENT OFFICE
CERTIFICATE OF CORRECTION

Patent No. 3,627,726            Dated December 14, 1971

Inventor(s) Arthur J. Krawczyk        PAGE - 2

It is certified that error appears in the above-identified patent and that said Letters Patent are hereby corrected as shown below:

Column 10, line 55, change the formula to:

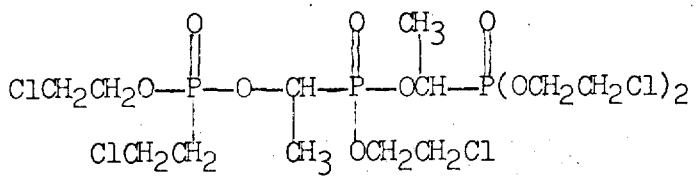

Signed and sealed this 13th day of June 1972.

(SEAL)
Attest:

EDWARD M. FLETCHER, JR.        ROBERT GOTTSCHALK
Attesting Officer              Commissioner of Patents